Sept. 14, 1926.  E. W. BAGGOTT  1,599,548
VERNIER ATTACHMENT
Filed April 12, 1924
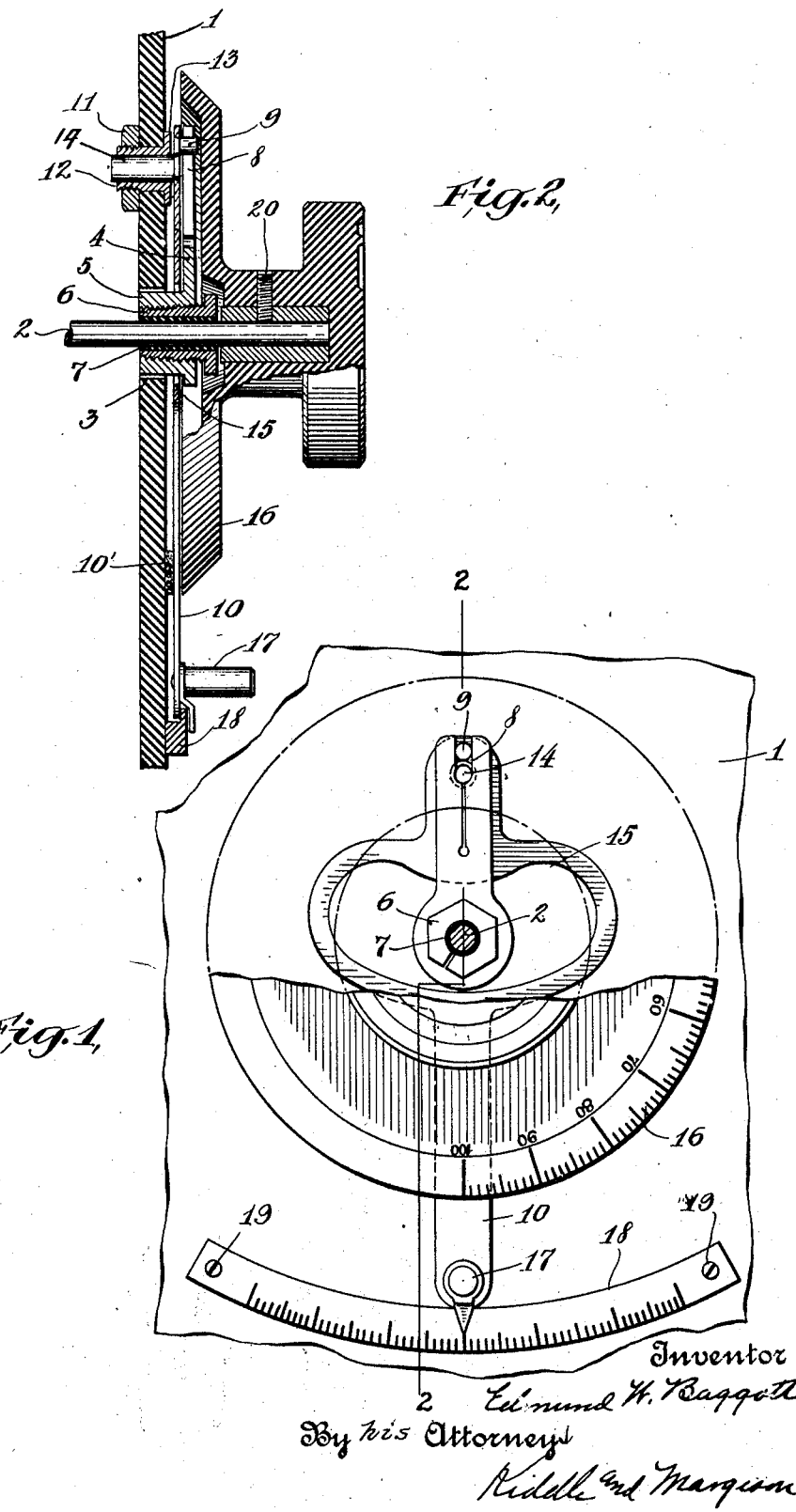
Fig. 2,
Fig. 1,
Inventor
Edmund W. Baggott
By his Attorneys
Riddell and Marquson.

Patented Sept. 14, 1926.

1,599,548

UNITED STATES PATENT OFFICE.

EDMUND W. BAGGOTT, OF BROOKLYN, NEW YORK.

VERNIER ATTACHMENT.

Application filed April 12, 1924. Serial No. 706,140.

My invention is directed to an improvement in vernier attachments and is particularly useful in the art of radio, being particularly adapted for application to any of the well-known instruments employed in the radio art in which a rotatable shaft is present such, for instance, as variometers, vario-couplers, condensers, rheostats, potentiometers, etc.

One of the objects of the invention is the provision of an attachment capable of being readily applied to any of the instruments above indicated and which will give a very fine, minute adjustment of the particular instrument to which it is applied.

A further object of the invention is the provision of a vernier attachment such as above indicated wherein the particular instrument may be given an extremely small movement and wherein the setting of the instrument will be accurately indicated. I am aware, for example, of vernier attachments employed in connection with condensers wherein a plate separate from the other condenser plates is employed for vernier adjustment, but in such devices the moment the vernier plate is moved the dial setting of the condenser is thrown out, the dial not moving with the separate plate.

A further object of my invention is the provision of a vernier attachment in such a manner that when the vernier attachment is operated the dial of the instrument to which the attachment is applied will be moved correspondingly, thereby always insuring accurate dial settings.

A further object of the invention is the provision of a vernier attachment adapted to be readily applied to a rotatable shaft in which no change need be made in the instrument to which my device is attached, it being merely necessary to attach the device directly to the shaft, which is to be rotated thereby, a small hole being required for the reception of a pin of some sort to which a portion of the device is anchored or by which, in the case of radio apparatus, the attachment is anchored to the panel.

In general my device comprises a bearing member or hub adapted to be slipped over the end of a shaft to which the device is attached, this part of the device being held to the shaft by a tapered split bushing. This bushing is formed on an arm extending some distance from the shaft to be rotated and at the end of this arm I provide an eccentric, this eccentric being operated by a relatively long arm, the end of which extends beyond the edge of the dial of the particular instrument to which the device is attached. The eccentric end of my improved device is anchored to a panel or other suitable support. By moving the long operating arm motion is transmitted to the shaft to which the device is attached to move or adjust the instrument. When the vernier is not in use the instrument may be operated in the usual way with the usual knob.

In the accompanying drawings an embodiment of my invention has been illustrated—

Figure 1 showing my device in elevation, partly in section, while

Fig. 2 is a section on the line 2—2 of Fig. 1.

Referring to the drawings in detail, 1 designates a panel to which my improved attachment has been shown attached. It is to be understood that the showing of a panel is merely illustrative and not definitive inasmuch as the vernier can be anchored to any suitable support. 2 designates a rotatable shaft extending through a hole 3 in the panel, this shaft representing the shaft which is to be operated by my improved device and which may be, for example, the rotor shaft of a variometer, a vario-coupler, a condenser, rheostat, potentiometer, or other instrument. Mounted on this shaft is an arm 4, this arm being provided with a bearing 5 at the end adjacent the shaft 2. The arm 4, it will be understood, extends radially with respect to the shaft 2. The arm 4 is attached to the shaft 2 by means of a split, tapered bushing 6, this bushing being insulated, as indicated at 7, from the shaft 2 and screwed into the bearing 5. By being tapered exteriorly it will be seen that when this bushing is screwed through in place, the arm 4 will be frictionally held to the shaft 2.

The outer end of the arm 4 is provided with a slot or fork 8 for the reception of a pin 9. The pin 9 is carried by an operating arm 10, this arm being relatively long and being anchored to the panel 1 by a nut 11 and bushing 12. Passing through the bushing 12 and the head 13 thereof is a pin 14 riveted to the arm 10 and providing a fulcrum therefor. The pin 9 is eccentric to the pin 14.

The arm 10 is provided with an arcuate slot 15 through which passes the shaft 2 and the lower end of this arm extends beyond the lower edge of a dial 16, which is the usual dial. For operating the arm 10 I provide the same with a knob 17.

I prefer to provide the arm 10 on its underside with a felt pad 10' which will bear against the face of the panel 1 to prevent the same from being marked due to operation of the arm 10.

18 designates an arcuate scale adapted to be attached to the panel just beneath the lower end of the arm 10 and held to the panel in any suitable manner, as by two small screws 19. If desired this scale may project far enough beyond the face of the panel 1 to form a guide or rest for the lower end of the operating arm 10.

In installation and operation the shaft 2 is passed through the hole 3 in the panel 1, the bearing 5 is then slipped over the outer end of the shaft and attached thereto by screwing down the split bushing 6. Previous to this the bushing 12 will have been applied to the panel and the arm 10, which is attached thereto, slipped over the shaft 2, it being understood that the arm 10 underlies the short arm 4. When the arm 4 is applied and before setting up the split bushing 6, the fork in the outer end of this short arm 4 is slipped over the pin 9. The dial 16 is then applied in the usual way to the shaft 2 and held in place by a set-screw 20. In operation the dial 16 may be employed in the usual way to rotate the shaft 2 until the almost exact setting of the particular instrument to which the device may be applied has been reached, whereupon the lower end of the arm 10 may be swung in the arc of a circle either to the right or to the left as the case may be, as viewed in Fig. 1, to move the dial to the exact setting required. By reason of the length of the arm 10 as compared with the distance between the fulcrum 14 and eccentric pin 9, it will be apparent that considerable motion may be imparted to the arm 10 to move the dial 16 but a very short—in fact, extremely short—distance. The movement of the arm 10 causes the short arm 4 to rotate, and inasmuch as this arm is frictionally held to the shaft 2, the shaft 2 is thereby caused to rotate and likewise the dial 16 so that the reading of the dial 16 after the vernier has been operated is accurate as distinguished from that type of vernier, such as employed in connection with some condensers, wherein a separate plate only is moved by the vernier attachment. The scale 18 gives a convenient reading of the attachment. It will be understood, however, that this scale may be dispensed with if desired and reliance placed only on the dial 16.

From the foregoing it will be apparent that I have provided a vernier attachment which is extremely simple in construction, easy to operate, and may be applied very quickly to any instrument desired. It will be seen also that no particular skill is required in attaching my improved device to a shaft or other member to be rotated and that any movement of the attachment will be imparted to the shaft to which the same is applied and that a corresponding motion will always be imparted to the dial if a dial be employed.

While I have described a specific embodiment of my invention, it is to be understood that changes may be made in the details thereof without departing from the spirit and scope of the invention.

What I claim is:

1. In a device of the character described, the combination of an arm, a split, tapered bushing adapted to attach one end of said arm to a shaft to be rotated, an operating arm, a fulcrum therefor eccentric to said shaft, and a connection between said arms eccentric to said fulcrum whereby movement of the operating arm will impart a rotary movement to the first-mentioned arm and the shaft to which it is attached.

2. In a device of the character described, the combination of an operating arm, said arm being provided with an arcuate slot adapted to accommodate a shaft to be rotated, a fulcrum for said operating arm, a second arm adapted to be frictionally attached to said shaft, said second arm having an operative connection with the operating arm at a point eccentric to said fulcrum.

3. In combination a panel, a shaft extending therethrough, an operating arm receiving said shaft and fulcrumed on said panel, a scale for said operating arm and interposed between said arm and panel and providing a bearing surface for said arm, and a second arm operatively connected to the operating arm and frictionally attached to said shaft whereby movement of said operating arm along said scale will cause said shaft to be rotated.

4. In a device of the character described, the combination of an operating arm, a pad of relatively soft material attached to the underside of said arm, a fulcrum for said arm, a pin carried by the end of said arm and eccentric relatively to said fulcrum, a second arm having one end operatively connected to said pin, the opposite end of said second arm being frictionally attached to a shaft received by the operating arm whereby movement of said operating arm about its fulcrum will cause the second arm and the shaft attached thereto to be rotated.

5. In a radio vernier tuning device, a panel, a shaft in said panel, a dial on said shaft mounted to rotate in front of said panel, means behind said dial adapted to rotate with said shaft, and other means engaging said first means and straddling said shaft for rotating said first means for turning said dial.

6. In a radio tuning device, a shaft adapted to extend through a panel and adapted to be connected to a tuning instrument behind said panel, a dial detachably connected to said shaft in front of said panel, a vernier lever adapted to be fulcrumed on its rear face in said panel at a point adjacent the periphery of said dial, said lever having a portion extending beyond said dial and adapted to be manually manipulated, said lever having a lug at its front face, means connected with said dial for slidably engaging said lug, whereby rotation of said vernier lever will cause said dial to rotate through a much smaller angle.

7. In a radio tuning device, a shaft adapted to extend through a panel, a dial on said shaft, a plate mounted on said shaft, a vernier lever between said plate and said panel and engaging said plate for rotating said shaft and dial, said vernier lever having relatively narrow end sections and an oval-shaped intermediate section, one of said end sections depending below said dial and having a manipulating knob, the other end section having a forwardly extending lug for slidably engaging said plate, and a rearwardly extending pin journaled in said panel to form a fulcrum for said lever, said intermediate section being cut out and spaced from said shaft.

This specification signed this 9th day of April, 1924.

EDMUND W. BAGGOTT.